(12) United States Patent
Chu

(10) Patent No.: US 11,546,741 B2
(45) Date of Patent: Jan. 3, 2023

(54) CALL ROUTING USING CALL FORWARDING OPTIONS IN TELEPHONY NETWORKS

(71) Applicant: Phoneic, Inc., San Mateo, CA (US)

(72) Inventor: Enlai Chu, San Mateo, CA (US)

(73) Assignee: PHONEIC, INC., San Mateo, CA (US)

(*) Notice: Subject to any disclaimer, the term of this patent is extended or adjusted under 35 U.S.C. 154(b) by 0 days.

(21) Appl. No.: 17/081,682

(22) Filed: Oct. 27, 2020

(65) Prior Publication Data

US 2021/0044943 A1 Feb. 11, 2021

Related U.S. Application Data

(63) Continuation of application No. 16/024,396, filed on Jun. 29, 2018, now Pat. No. 10,841,755.
(Continued)

(51) Int. Cl.
*H04W 4/16* (2009.01)
*H04M 3/54* (2006.01)
*H04M 3/42* (2006.01)

(52) U.S. Cl.
CPC ......... *H04W 4/16* (2013.01); *H04M 3/42059* (2013.01); *H04M 3/543* (2013.01);
(Continued)

(58) Field of Classification Search
CPC .......... H04M 3/54; H04M 3/543; H04M 1/27; H04M 15/58; H04W 68/00; H04W 4/16; H04L 12/5835
(Continued)

(56) References Cited

U.S. PATENT DOCUMENTS

| 5,020,090 A | 5/1991 | Morris |
| 5,127,042 A | 6/1992 | Gillig et al. |

(Continued)

FOREIGN PATENT DOCUMENTS

| CN | 1742273 A | 4/2003 |
| CN | 103155606 B | 8/2017 |

(Continued)

OTHER PUBLICATIONS

H.-N. Chua, P. Legrand, K. W.-J. Khoo, S. Ringland and B. Legat, "Innovative Call Routing: Concept and Experimental Observations," 2008 IEEE Asia-Pacific Services Computing Conference, 2008, pp. 1538-1543, doi: 10.1109/APSCC.2008.51. Dec. 2008 (Year: 2008).*

(Continued)

*Primary Examiner* — William D Cumming
(74) *Attorney, Agent, or Firm* — Kwan & Olynick LLP

(57) ABSTRACT

In some embodiments, a method receives a call from a caller device that is initiated via a first communication channel and directed to first contact information for a recipient's device. The call is forwarded using a call forwarding option to the computing device. Second contact information for the recipient's device is retrieved where the second contact information different from the first contact information used in the call. The method initiates a communication to the recipient's device using the second contact information via a second communication channel that is different from the first communication channel. The communication avoids triggering the call forwarding option for the recipient's device. The call is connected between the caller device and the recipient's device upon initiating the communication where the computing device is in a call path of the call and performs a call feature for the call.

20 Claims, 7 Drawing Sheets

Related U.S. Application Data

(60) Provisional application No. 62/528,037, filed on Jul. 1, 2017.

(52) U.S. Cl.
CPC ........ *H04M 3/42127* (2013.01); *H04M 3/545* (2013.01); *H04M 2201/60* (2013.01)

(58) Field of Classification Search
USPC .......................................... 455/433; 340/7.22
See application file for complete search history.

(56) References Cited

U.S. PATENT DOCUMENTS

| | | | |
|---|---|---|---|
| 5,239,571 A | 8/1993 | Takahashi | |
| 5,255,306 A | 10/1993 | Melton et al. | |
| 5,260,988 A | 11/1993 | Schellinger et al. | |
| 5,295,179 A | 3/1994 | Asahara et al. | |
| 5,329,574 A | 7/1994 | Nielson et al. | |
| 5,367,558 A | 11/1994 | Gillig et al. | |
| 5,432,840 A | 7/1995 | Ryden | |
| 5,463,674 A | 10/1995 | Gillig et al. | |
| 5,491,740 A | 2/1996 | Ellis et al. | |
| 5,504,803 A | 4/1996 | Kamada et al. | |
| 5,533,097 A | 7/1996 | Crane et al. | |
| 5,568,536 A | 10/1996 | Tiller et al. | |
| 5,590,172 A | 12/1996 | Lodwig et al. | |
| 5,608,782 A | 3/1997 | Carlsen et al. | |
| 5,610,973 A | 3/1997 | Comer | |
| 5,610,974 A | 3/1997 | Lantto | |
| 5,631,947 A | 5/1997 | Wittstein et al. | |
| 5,636,266 A | 6/1997 | Ranganath et al. | |
| 5,644,626 A | 7/1997 | Carlsen et al. | |
| 5,657,373 A | 8/1997 | Hermansson et al. | |
| 5,659,596 A | 8/1997 | Dunn | |
| 5,717,737 A | 2/1998 | Doviak et al. | |
| 5,742,666 A | 4/1998 | Alpert | |
| 5,787,149 A | 7/1998 | Yousefi et al. | |
| 5,828,949 A * | 10/1998 | Silver | H04W 68/00 |
| | | | 455/433 |
| 5,842,122 A | 11/1998 | Schellinger et al. | |
| 5,884,167 A | 3/1999 | Carlsen et al. | |
| 5,885,083 A | 3/1999 | Ferrell | |
| 6,011,960 A | 1/2000 | Yamada et al. | |
| 6,141,560 A | 10/2000 | Gillig et al. | |
| 6,157,640 A | 12/2000 | Valentine | |
| 6,192,254 B1 | 2/2001 | Carlsen et al. | |
| 6,434,143 B1 | 8/2002 | Donovan | |
| 6,473,611 B2 | 10/2002 | Hurme | |
| 6,545,589 B1 * | 4/2003 | Fuller | H04M 1/27 |
| | | | 340/7.22 |
| 6,556,823 B2 | 4/2003 | Clapton et al. | |
| 6,570,555 B1 | 5/2003 | Prevost et al. | |
| 6,577,712 B2 | 6/2003 | Larsson et al. | |
| 6,807,529 B2 | 10/2004 | Johnson et al. | |
| 6,912,581 B2 | 6/2005 | Johnson et al. | |
| 7,050,558 B1 | 5/2006 | Pershan et al. | |
| 7,127,400 B2 | 10/2006 | Koch | |
| 7,167,468 B2 | 1/2007 | Donovan | |
| 7,203,486 B2 | 4/2007 | Patel | |
| 7,222,075 B2 | 5/2007 | Petrushin | |
| 7,272,564 B2 | 9/2007 | Phillips et al. | |
| 7,376,645 B2 | 5/2008 | Bernard | |
| 7,398,209 B2 | 7/2008 | Kennewick et al. | |
| 7,599,351 B2 | 10/2009 | Gallant et al. | |
| 7,773,585 B2 | 8/2010 | Donovan | |
| 7,822,188 B1 | 10/2010 | Kirchhoff et al. | |
| 7,921,214 B2 | 4/2011 | Da Palma et al. | |
| 8,060,565 B1 | 11/2011 | Swartz | |
| 8,131,556 B2 | 3/2012 | Barton et al. | |
| 8,442,563 B2 | 5/2013 | Chen et al. | |
| 8,509,393 B2 | 8/2013 | Donovan | |
| 8,532,089 B2 | 9/2013 | Dalrymple et al. | |
| 8,543,665 B2 | 9/2013 | Ansari et al. | |
| 8,543,704 B2 | 9/2013 | Bowater et al. | |
| 8,700,782 B2 | 4/2014 | Chandrasekaran et al. | |
| 8,811,164 B2 | 8/2014 | Gallant | |
| 8,855,107 B1 | 10/2014 | Kirchhoff et al. | |
| 8,886,169 B2 | 11/2014 | Hussain et al. | |
| 9,124,722 B2 * | 9/2015 | Gallant | H04L 9/40 |
| 9,191,789 B2 | 11/2015 | Pan | |
| 9,357,064 B1 | 5/2016 | Walton | |
| 9,443,518 B2 | 9/2016 | Gauci | |
| 9,509,838 B2 | 11/2016 | Leeds et al. | |
| 9,584,658 B2 | 2/2017 | Cohen et al. | |
| 9,674,341 B1 | 6/2017 | Pakidko et al. | |
| 9,674,351 B1 | 6/2017 | Mason | |
| 9,680,979 B1 | 6/2017 | Chevrier et al. | |
| 10,841,755 B2 * | 11/2020 | Chu | H04M 3/543 |
| 2001/0019604 A1 | 9/2001 | Joyce et al. | |
| 2001/0023183 A1 | 9/2001 | Palviainen et al. | |
| 2001/0036256 A1 | 11/2001 | Larsson et al. | |
| 2001/0041557 A1 | 11/2001 | Hurme | |
| 2002/0025821 A1 | 2/2002 | Clapton et al. | |
| 2002/0057765 A1 | 5/2002 | Hyziak et al. | |
| 2002/0071429 A1 | 6/2002 | Donovan | |
| 2002/0136206 A1 | 9/2002 | Gallant et al. | |
| 2004/0233892 A1 | 11/2004 | Roberts et al. | |
| 2004/0258233 A1 | 12/2004 | Poustchi et al. | |
| 2005/0119005 A1 | 6/2005 | Segal et al. | |
| 2005/0222815 A1 | 10/2005 | Tolly | |
| 2007/0038436 A1 | 2/2007 | Cristo et al. | |
| 2007/0121591 A1 | 5/2007 | Donovan | |
| 2007/0167167 A1 | 7/2007 | Jiang | |
| 2007/0274496 A1 | 11/2007 | Singh et al. | |
| 2009/0219925 A1 | 9/2009 | Donovan | |
| 2009/0238169 A1 | 9/2009 | Dalrymple et al. | |
| 2009/0238177 A1 | 9/2009 | Donovan | |
| 2009/0326939 A1 | 12/2009 | Toner et al. | |
| 2010/0063815 A1 | 3/2010 | Cloran et al. | |
| 2010/0217837 A1 | 8/2010 | Ansari et al. | |
| 2010/0260173 A1 | 10/2010 | Johnson | |
| 2011/0112833 A1 | 5/2011 | Frankel et al. | |
| 2012/0022872 A1 | 1/2012 | Gruber et al. | |
| 2013/0031476 A1 | 1/2013 | Coin et al. | |
| 2013/0090931 A1 | 4/2013 | Ghovanloo et al. | |
| 2013/0108994 A1 | 5/2013 | Srinivasa et al. | |
| 2013/0165083 A1 | 6/2013 | Fighel et al. | |
| 2015/0149169 A1 | 5/2015 | Chang | |
| 2016/0072955 A1 | 3/2016 | Barkan | |
| 2017/0093931 A1 | 3/2017 | Chinnapatlolla et al. | |
| 2017/0279906 A1 | 9/2017 | Laird-McConnell et al. | |
| 2019/0007806 A1 * | 1/2019 | Chu | H04M 3/42059 |
| 2021/0044943 A1 * | 2/2021 | Chu | H04W 4/16 |

FOREIGN PATENT DOCUMENTS

| | | | | |
|---|---|---|---|---|
| CN | 107870994 A | | 4/2018 | |
| EP | 0 966 145 A2 | | 12/1999 | |
| EP | 1511286 A1 | | 2/2005 | |
| EP | 1540494 A1 | | 6/2005 | |
| EP | 2237533 A1 | | 6/2010 | |
| EP | 2704409 A1 * | | 3/2014 | .............. H04M 3/54 |
| EP | 1922849 B1 * | | 9/2016 | ......... H04L 12/5835 |
| JP | 2008-547061 A | | 12/2008 | |
| KR | 20110051878 A | | 5/2011 | |
| WO | 99/31856 A1 | | 6/1999 | |
| WO | 2012001016 A1 | | 1/2012 | |
| WO | 2015/014845 A1 | | 2/2015 | |
| WO | WO-2020076344 A1 * | | 4/2020 | .............. H04M 3/54 |

OTHER PUBLICATIONS

Passive Electronic Telephone Profile Reinitiator by Warren III, et al 1993 (Year: 1993).*

M. A. Azad and R. Moria, "Multistage SPIT detection in transit VoIP," SoftCOM 2011, 19th International Conference on Software, Telecommunications and Computer Networks, 2011, pp. 1-9. (Year: 2011).*

(56) References Cited

OTHER PUBLICATIONS

International Search Report and Written Opinion for International Appln. No PCT/US2018/055698 dated Jul. 11, 2019, 13 pages.

* cited by examiner

CALL ROUTING USING CALL FORWARDING OPTIONS IN TELEPHONY NETWORKS

CROSS REFERENCE TO RELATED APPLICATIONS

This application is a continuation application and, pursuant to 35 U.S.C. § 120, is entitled to and claims the benefit of earlier filed application U.S. application Ser. No. 16/024,396 filed Jun. 29, 2018, which claims priority to U.S. Provisional App. No. 62/528,037, entitled "Mixed-Mode Communications for Audio Calls", filed Jul. 1, 2017, the contents of all of which are incorporated herein by reference in its entirety.

BACKGROUND

Cellular phone calls have traditionally lacked any features besides basic initiation of a two-way voice call (e.g., answering a call) and voicemail (e.g., declining a call). While additional voice features such as call recording and transcription exist in telephony systems, these features have not been accessible by calls made directly to a cellular phone number.

The lack of access is because access to native voice calls is limited to the cellular ecosystem, which includes mobile operators and their equipment vendors, mobile device operating systems, and device manufacturers. As a result, third-party applications and developers have not had the ability to easily tap into and manipulate native voice calls.

The cellular ecosystem has not opened up the development of mobile calling features to third party developers due in part to the security concerns such as unauthorized eavesdropping. Additional complexities include the need for technology standardization as well as the coordination and cost required to provide and manage this access. Additionally, the cellular industry has traditionally focused their efforts on broader-reach consumer features such as increased data bandwidth and higher clarity voice calls instead of features that may only be relevant to specific groups such as professionals or industries that require them due to legal regulations.

Hence, cellular phone calls and the phone's native dialer application (also known as the "dialer app" or "phone app") have not been the focus of feature innovations even though some features, such as the ability to record and transcribe mobile calls, would be useful to individuals such as sales professionals for coaching purposes or in the financial services industry, which currently mandates that communications with clients be recorded and archived.

DETAILED DESCRIPTION

Figure 1:
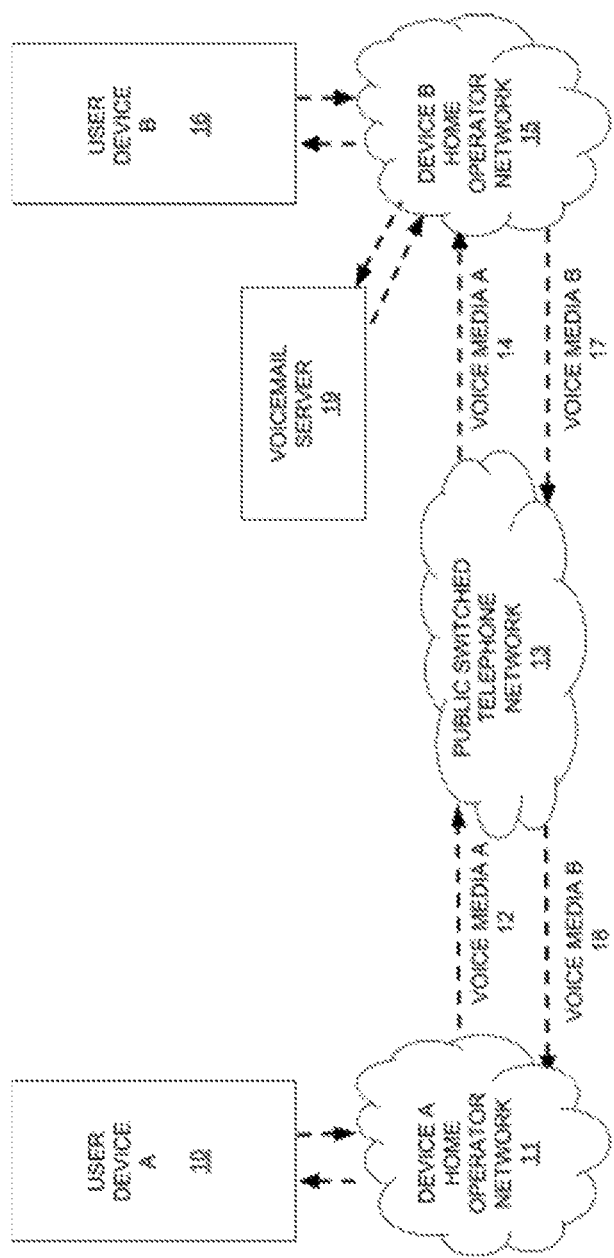
FIG. 1 depicts an example of a Public Switched Telephone Network (PSTN) according to some embodiments.

Described herein are techniques for a communication system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

A method, computer system, computer program product, phone application, and user interface is provided for enabling call recording, transcription and other features on cellular phone calls that have traditionally been isolated from third-party applications. In order to add features and functionality to cellular phone calls, a system inserts itself between the caller and recipient's call. In some embodiments, the insertion is accomplished by configuring settings, such as the call forwarding settings, for the mobile device to divert calls to an application server instead of the default voicemail server of the wireless operator. This way, incoming calls can pass through application servers that apply new features to the calls before connecting the calls to a chosen destination. The features may include additional features that are not present in a callee to caller connection. Instead of the caller's call being connected to the recipient directly, the call passes through the application server before being connected with the recipient. The application server remains in the path of the call and is able to provide features for routing as well as processing media for the duration of the call.

An application ("device application") residing on the mobile device can communicate and coordinate with the application server using a data connection to perform additional functionality on the mobile device. This device application can enable control functions such as starting and stopping call recording on the server, transferring the call to another party, sending the call to voicemail or choosing a specific voicemail greeting to play, etc.

The device application can also be used by the recipient to make outbound calls so that the calls can first pass through the application servers before being connected to the intended recipient, thereby enabling new call features for outgoing calls as well.

The device application can also organize and display a history of inbound and outbound calls, call recordings, and transcripts by individual contacts. The text in the recordings can be indexed by the device application or a server-side storage engine and made searchable.

The application server can also send a copy of the audio streams to other services in real-time. For example, the participants' speech can be sent to a speech-to-text engine and the resulting text shown to participants in the conversation to aid in comprehension should users have difficulty hearing each other. The audio or text can also be used by in-call virtual assistants that use natural language processing (NLP) to understand the conversation and perform actions in response to what is spoken.

Traditionally, phone calls made to a recipient's mobile device are routed from the caller's operator to the callee's operator through the circuit-switched Public Switched Telephone Network (PSTN). FIG. 1 depicts an example of a PSTN according to some embodiments. As shown in FIG. 1, the phone call is routed from an initial calling device 10 (e.g., user device A) to the caller's home operator network 11, then through a network 13, such as a Signaling System No. 7 (SS7) network (e.g., PSTN), and finally to the recipient's operator network 15 and recipient's device 16 (e.g., user device B). The call is routed using the recipient's PSTN number (e.g., a cellular phone number).

The audio stream from the first user device passes between both operators' networks and equipment through the PSTN at 12 and 14, and the audio stream from the second user device passes the opposite way at 17 and 18 before reaching the first user's home operator network 11 and device 10.

The recipient's device 16 may be configured to redirect the call to voicemail via device settings. This setting may ring the recipient's device first before redirection. For example, if the conditional call forwarding (CCF) settings for the receiver's device have been configured to redirect the caller to the receiver's network operator's voicemail number, the call is redirected to voicemail using the voicemail number and the caller will hear the voicemail greeting and be asked to leave a message.

Some configured CCF settings include Call Forwarding Busy (CFB) whereby incoming calls are diverted when the recipient is on another call or rejects the call by choosing the Decline option on the incoming call screen; Call Forwarding on No Answer (CFNA) whereby incoming calls are not answered within a specified number of seconds; and Call Forwarding on Not Reachable (CFNRC) where the recipient's device is off or does not have coverage.

The recipient's device can also be configured with Call Forward Unconditional (CFU), which will unconditionally divert all calls to a specified phone number. This will cause all inbound calls made to the recipient's phone number to be sent to the specified number without first ringing the recipient's phone.

In some embodiments, call forwarding can be configured on mobile devices using settings of the operating system, such as via the settings menus. Alternatively, call forwarding can be configured using codes, such as Unstructured Supplementary Service Data (USSD) codes, also known as "star codes", which are entered into the mobile device's native phone dialer and called. Each carrier may have a different set of star codes to perform each type of forwarding configuration.

Typically, call forwarding forwards calls to a voicemail server. However, for new calling features to be applied to incoming calls, incoming phone calls should be sent to an application server before being answered by the recipient. Either unconditional call forwarding or conditional call forwarding can be used to accomplish this call flow by configuring a forwarding phone number that corresponds to the application server, which replaces the voicemail server's phone number that may have been configured originally.

Typically, once the call was redirected to the voicemail server, the recipient could not answer the call. However, some embodiments apply the calling features while also connecting the call to the recipient. For the recipient to communicate with the caller, after redirection to the application server, the application server may connect the incoming call between the application server and the recipient. When the application server receives a diverted phone call as a result of the call forwarding setting the user has configured, at least two pieces of information have been added to the signaling that the application server receives from the phone network: the caller's phone number and the original dialed number (e.g., the recipient's phone number). The application server uses the two pieces of information to initiate a call between the application server and the recipient's device. One example of how this information is transmitted includes using a header in a control message to include the numbers. For example, a Diversion header of session initiation protocol (SIP) messages that are used in call control of VoIP calls may include the numbers. Other information that is transmitted includes the reason for the diversion, the number of times the call was diverted, etc.

Figure 2:
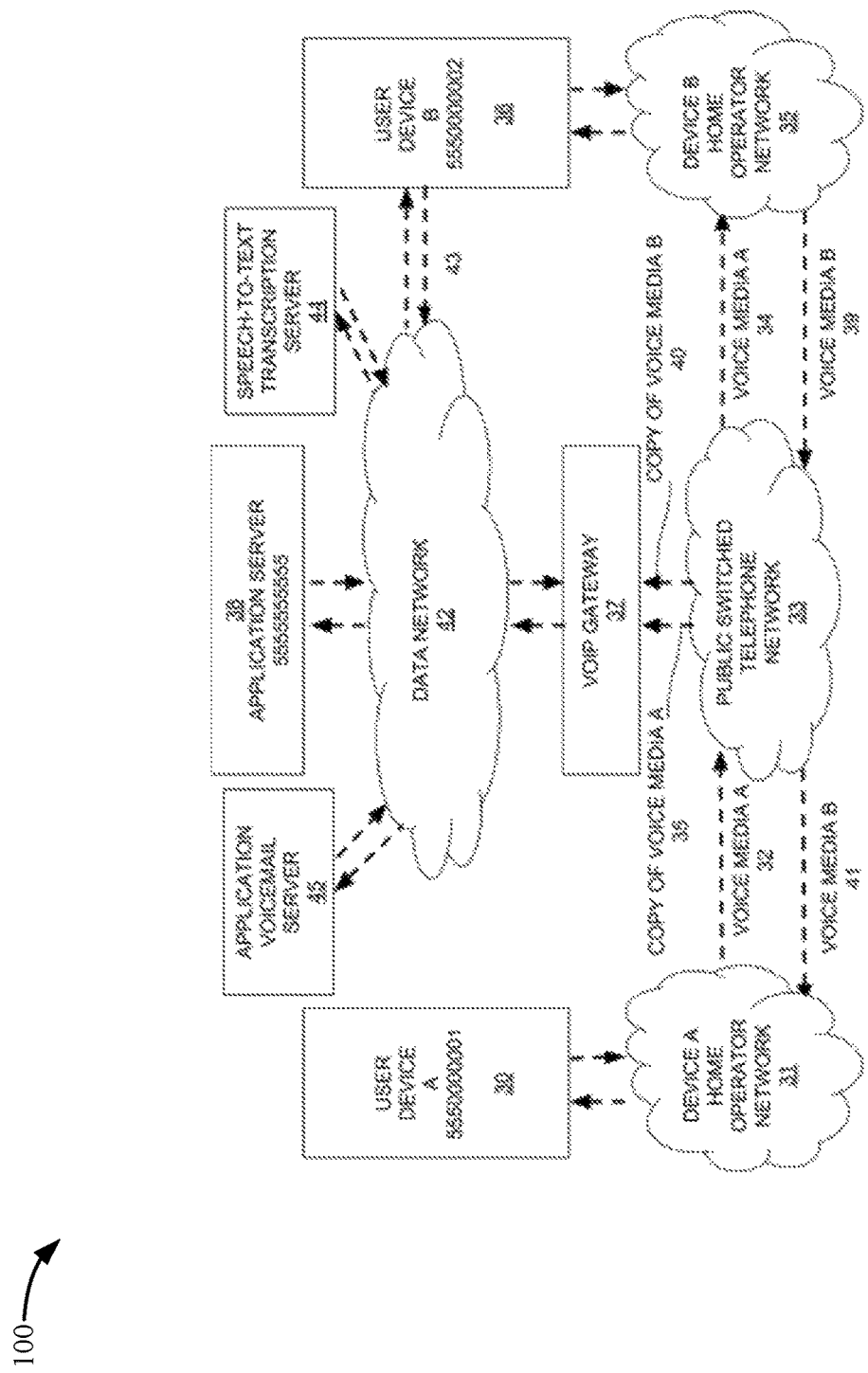
FIG. 2 shows the flow of calls where the recipient device has call forwarding set up and the forwarding number is configured to be a Direct Inward Dial (DID) number that routes the calls to the application server 38 according to some embodiments.

FIG. 2 shows the flow of calls where the recipient device has call forwarding set up and the forwarding number is configured to be a Direct Inward Dial (DID) number that routes the calls to the application server 38 according to some embodiments. The recipient's device may set up call forwarding and specify the application server's phone number as the forwarding number. The call forwarding may be set using a device application or by an operating system menu or feature of the recipient's device.

When a phone call is made by a caller device 30, the call is carried by caller's operator network 31 and passes through the PSTN 33 to the recipient's operator network 35. Because of the call forwarding setup, instead of sending the call to the recipient's device 36, the recipient's operator network diverts the call to the application server's phone number that is configured by the call forwarding settings of the user's phone number. The provider servicing the application server's phone number converts the PSTN call to a VoIP call using a telephony gateway 37 and the call is then carried over a data network 42 to the application server. The application server receives the inbound call (e.g., the first "call leg") from the caller, initiates a new call with the recipient device (e.g., the second call leg) and bridges the two calls so the caller and callee's calls are connected. That is, application server 38 is connected in between the caller and the callee and bridges the two calls.

The call made by the application server 38 to the callee can be a circuit-switched (PSTN) call or a Voice over IP call. If a PSTN call is chosen, a VoIP call may first be initiated from the application server 38 to the data network 42 and sent out the VoIP gateway 37, which converts the VoIP call to a PSTN call. The call is routed through the PSTN 33 to the recipient device's operator network 35 and on to the recipient's device 36. If a VoIP call is chosen, the application server establishes a VoIP connection at 43 with the recipient's device 36 through a data connection instead of a PSTN connection.

In both embodiments, the application server 38 sits in the voice path between the calling device 30 and the recipient device 36, giving application server 38 the ability to provide features such as recording the media passing through application server 38 or sending a copy of the media to a speech-to-text engine 44 to convert the voice media to text in real time. The text can be input to a language translation engine 47 that translates it into the recipient's language. The text from the translation can then be sent to a text-to-speech engine 46 and the audio output can be sent to the application server 38 and played in the call to the recipient device 36. The reverse process can then be followed for speech from the recipient where the application server 38 sends a copy of the recipient's speech to the speech-to-text server 44 and the resulting text sent to the language translation engine 47 for translation to the caller's language. The application server 38 sends the resulting converted text to the text-to-speech engine 46 and speech is played back by the application server 38 into the call for the caller to hear.

Because the recipient operator's voicemail server is no longer configured in the call forwarding settings for the user's phone number, application server 38 can provide its own voicemail functionality to the recipient by routing the call to a voicemail server 45 separate from the operator's voicemail server.

Application server 38 may be inserted into the call path using different call forwarding techniques. Within each technique, different methods of inserting application server 38 into the call path may be used. The insertion of application server 38 may be accomplished using settings native to an operating system of the recipient's device 36 or by using a device application downloaded to the recipient's device 36. The use of the native settings allows application server 38 to be inserted into the call path without having any other applications downloaded to the recipient's device 36. The features can be provided in the call path seamlessly and without the requirement of having an application running on the recipient's device 36. This provides many advantages. For example, an application does not need to be downloaded to the recipient's device 36. Also, the features can be provided without having an application running on the recipient's device 36 or running in the background. Further, an application does not need to be opened to provide the features when a call is received. The use of the setting of the operating system allows the processing of the features to be solely in the application server 38. This configuration uses less resources on the recipient's device 36 because the processing is performed on the application server 38 without the need for an application to be running on the recipient's device 36.

Using application server 38 to provide features in the processing of media between the caller and the callee also provides advantages. Certain applications such as speech-to-text conversion/transcription or sentiment analysis from a speaker's voice requires significant computational power that may not be available on the recipient's device 36 whereas a more powerful application server 38 can be used for such features. Other applications such as Natural Language Processing (NLP) require large data sets that may not fit into the storage and memory on the recipient's device 36 but can do so on the application server 38. The operating system of the recipient's device 36 may also not permit an application to run in the background so call features would not be available if the recipient's device 36 is using a PSTN call in the foreground to connect to the application server 38.

The description below of various embodiments will explain in more detail how unconditional call forwarding and conditional call forwarding is used with four ways application server 38 can establish a call with a recipient device—outgoing VoIP call, incoming VoIP call, outgoing PSTN call, and incoming PSTN call.

Unconditional Call Forwarding

If all incoming calls, such as PSTN calls, to the recipient are to be diverted to application server 38, Unconditional Call Forwarding (UCF) may be used. However, after application server 38 receives the diverted call, application server 38 is not able to make an outbound PSTN call to connect to the recipient number since the call will be diverted back to application server 38 due to the call being unconditionally forwarded again. Because call forwarding settings may be configured with the device operator for PSTN calls only, VoIP calls to the device application are not diverted by the PSTN call forwarding rules and can be used to connect application server 38 with the device application.

In one embodiment, after application server 38 receives the inbound caller's diverted call, application server 38 analyzes the call to determine the call forwarding settings. For example, application server 38 determines whether UCF was used to redirect the call. Application server 38 may determine that UCF was used by looking at fields in the call that is received, such as in SIP messages. If UCF was used, then application server 38 determines that a call other than a PSTN call is needed. In other embodiments, application server 38 is preconfigured to recognize that UCF was used.

Outbound VoIP Call

Upon determining that UCF was used, application server 38 may connect to the recipient's device 36 using an outbound VoIP call. In order for application server 38 to know where to route the outgoing VoIP call, application server 38 can determine contact information for the recipient's device for a VoIP call. In some embodiments, the recipient's device application can register an address, such as the SIP address, where recipient's device 36 can be reached (e.g., Internet Protocol (IP) address, port, and transport protocol) to a registration server or database (not shown) that can be accessed by application server 38. Application server 38 can be configured to search the registration server for the recipient's VoIP address upon determining UCF was used.

Application server 38 can then make an outgoing VoIP call to the registered address of the recipient's device. The device application receives the VoIP call and shows the user an inbound call screen to give the user an option to answer or decline the call. If the user answers the call, application server 38 creates the VoIP connection between the device application and application server 38, and application server 38 bridges the call with the original caller's call leg.

If the device application has not yet registered its network address or the registration has expired, application server 38 can send the device application a push notification to ask the recipient's device 36 to register its network address. Once the network address is registered, application server 38 can retrieve the network address and then make an outbound VoIP call to the device application.

Inbound VoIP Call

In another embodiment, the push notification can also be used to trigger the device application to make a VoIP call to application server 38 instead of requiring the device application to register its network address or wait for the server to initiate a VoIP call to it. In this case, when the push notification is received by the device application, the device application shows the recipient the inbound call screen. The push notification will also contain the application server's contact information, such as a network and SIP address, so the device application can initiate a VoIP call to application server 38 when the recipient answers the call on the inbound call screen. The device application calls a SIP address that can contain instructions telling application server 38 which caller's PSTN call to bridge the call with. For example, the original caller's PSTN call could have a Call Identifier that is unique for each inbound calls on application server 38. The device application could embed this Call ID into the SIP address when making the VoIP call to application server so application server 38 can bridge the call to the correct caller's PSTN call leg.

Inbound PSTN Call

In another embodiment where a PSTN call between application server 38 and recipient device 36 is desired, the recipient's device 36 calls application server 38 (instead of application server 38 calling the device 36 because of the unconditional forwarding setup that prevents the recipient device 36 from receiving any PSTN calls). Thus, when an incoming call arrives at application server 38, application server 38 first sets up a mapping of known phone numbers that the recipient could be calling from, a dial-in phone number corresponding to application server 38 that the recipient device will call, and the caller's PSTN call leg identifier. Application server 38 then sends the recipient device a push notification with the dial-in number. When the device application receives the push notification, it shows the recipient an incoming call screen. When the recipient answers the call, the device application initiates a PSTN call from the device to the dial-in number of application server 38. When application server 38 receives the PSTN call, application server 38 looks up the original caller's call leg on application server 38 by using the recipient's phone number and bridges the recipient's call with the original caller's call leg.

Figure 3:
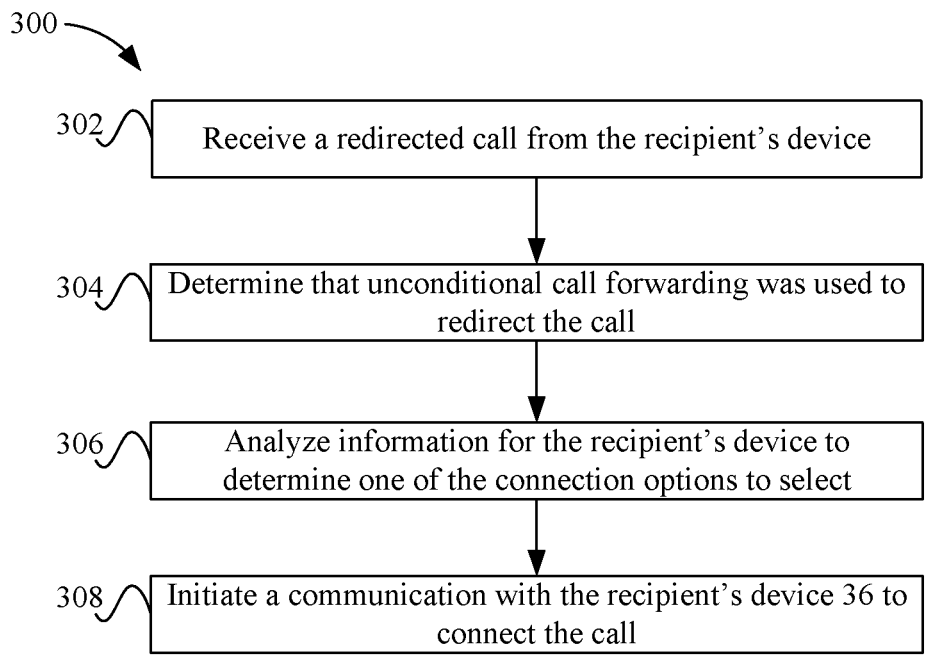
FIG. 3 depicts a simplified flowchart of a method for selecting a connection option for unconditional call forwarding according to some embodiments.

In some examples, application server 38 may select one of the connection options. FIG. 3 depicts a simplified flowchart of a method for selecting a connection option for unconditional call forwarding according to some embodiments. At 302, application server 38 receives a redirected call from the recipient's device 36. The call was redirected using unconditional call forwarding. At 304, application server 38 determines that unconditional call forwarding was used to redirect the call. In some embodiments, application server 38 determines that unconditional call forwarding was used by analyzing fields in a message received.

At 306, application server 38 analyzes information for the recipient's device to determine one of the connection options to select. The analysis may determine which option is the highest ranked option. For example, depending on a status of the recipient's device 36, a VoIP call may be desired. If a recipient's device is stationary and in an area with good data connectivity, a VoIP call may be preferred so the call does not consume PSTN minutes from the recipient's phone plan. If a recipient is in a moving vehicle where data connectivity is of an unpredictable nature, a PSTN call may be preferred. The device can report these conditions to the application server 38 and the application server 38 can select the appropriate connection to use for different conditions.

At 308, application server 38 initiates a communication with the recipient's device 36 to connect the call. The communication may use the selected connection option.

Conditional Call Forwarding

Some users may prefer to have certain calls to pass through application server 38 while allowing other calls to reach them directly. In order to accomplish this, Conditional Call Forwarding (CCF) can be used instead of Unconditional Call Forwarding (UCF). The use of CCF allows calls to reach recipients directly if the user picks up an incoming call. One configuration uses CCF to divert calls to the operator's voicemail service if the calls are unanswered, the mobile device is unreachable, or if the user is busy and chooses the Decline option on the incoming call screen of the phone.

Sending to Application Server by Declining Call

The device application can configure the CCF number to be the number of application server 38. By configuring the CCF number to be the application server's number, the call recipient is able to decline the call to divert the call to application server 38, which can remain in the path of the call while routing the call back to the recipient's phone. If the recipient chooses to answer the incoming call without declining it, the recipient will be able to speak to the caller without application server 38 in the path of the call.

Sending to Application Server Using Selective Call Blocking

In another embodiment, conditional call forwarding is used in conjunction with selective call blocking functionality on the recipient's device 36. Selective call blocking involves the specification of a list comprising one or more phone numbers (the "blocklist" on the recipient's device 36. When the phone number of an incoming caller (the "caller ID" number) matches a number on the blocklist, the recipient's device 36 automatically rejects the call and the call will be diverted to the phone number configured in the CCF settings. The call is then routed to application server 38.

Manual Configuration of Call Blocking

Blocklists may be used to prevent calls from undesirable phone numbers, such as a nuisance caller, from reaching the recipient. The recipient's device 36 can configure blocking and unblocking of individual callers in the mobile device configuration settings of the operating system. Blocking phone numbers manually causes the device to add the blocked numbers to the list of blocked numbers (the "blocklist") for the recipient's device 36.

When a call arrives on the recipient's device 36, the recipient's device 36 checks its blocklist and rejects the call before ringing the recipient's device 36. The blocked call is diverted to the number configured in the CCF settings. When the CCF number is configured to be the application server's number, the call is diverted to application server 38. In one embodiment, when application server 38 receives the diverted call, application server 38 initiates a VoIP or PSTN call to the recipient's device 36 with a different caller ID number that is known to not be on the blocklist of the device (for example, by setting the caller ID to be the CCF number of application server 38 so that the call rings through to the recipient device 36 instead of being blocked again). Application server 38 may receive the blocklist and analyze the blocklist to select a number not on the blocklist.

Figure 4:
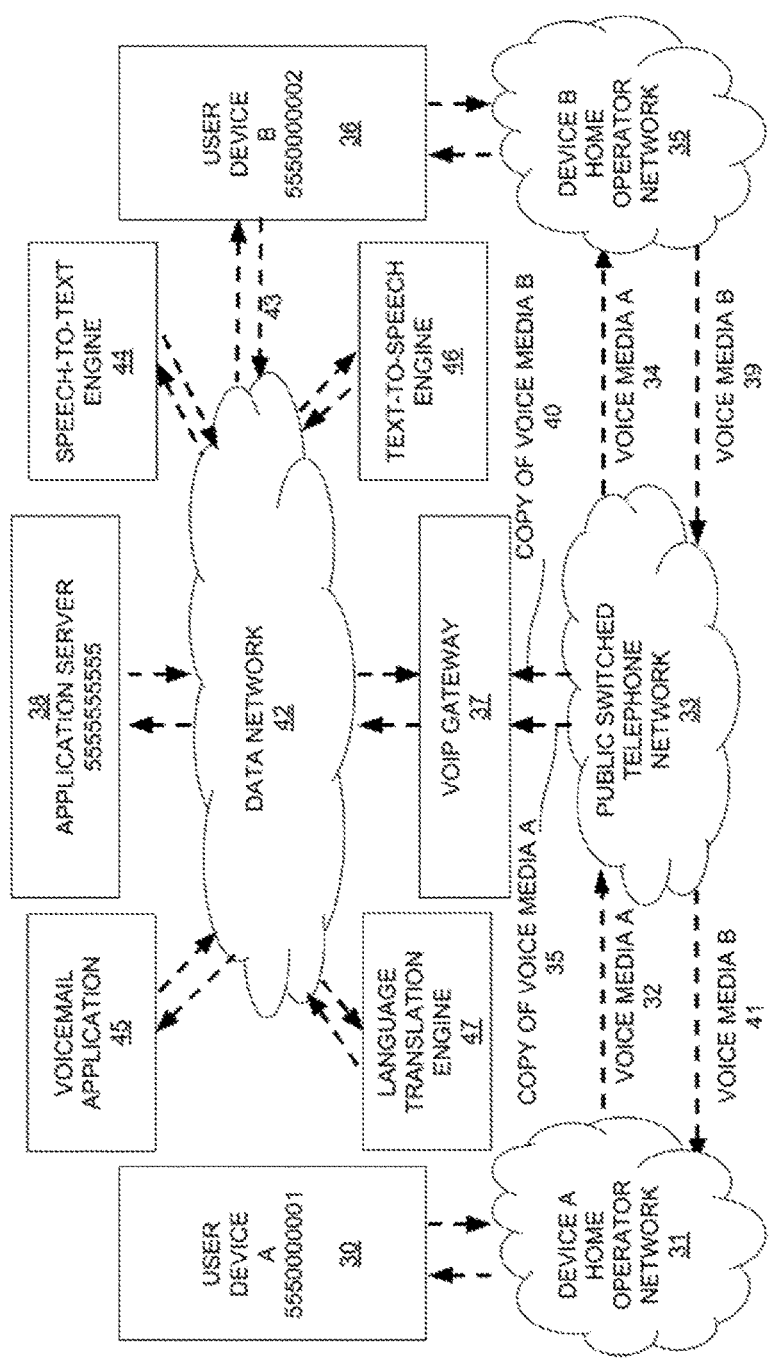
FIG. 4 shows a system with a calling device with phone number 5550000001 using a blocklist according to some embodiments.

FIG. 4 shows a system with a calling device 30 with phone number 5550000001 using a blocklist according to some embodiments. A recipient's device 36 with phone number 555-000-0002 has a configured blocklist that includes the caller's phone number 5550000001. The recipient's device 36 has a conditional call forwarding configuration to divert rejected calls to the application server at a phone number of 555-555-5555.

When the caller makes a call to the recipient device 555-000-0002, the caller's operator network 31 routes the call through the PSTN 33 to the recipient operator network 35 and recipient's device 36. The recipient's device 36 checks its blocklist, which includes the caller's number 5550000001, and rejects the call, sending the back to the recipient's operator network 35. The recipient's operator sends the call to the recipient's conditionally forwarded number, 555-555-5555 by routing the call back to the PSTN 33 and through the VoIP gateway for 555-555-5555. The call is sent to application server 38, which receives information from the incoming call signaling and diversion headers that the caller's number is 5550000001 and the original recipient number is 555-000-0002.

In some embodiments, a format of an example message, such as a SIP INVITE message, that the application server receives when the inbound call is diverted to the application server 38 can be seen below. "xxx" indicates server IP addresses or names that have been replaced for the purposes of this example.

```
INVITE sip:5555555555@xxx:5060 SIP/2.0
Record-Route: <sip:xxx;lr=on>
Via: SIP/2.0/UDP xxx;branch=z9hG4bKcb94.40ff17a3.0
Max-Forwards: 67
From:                <sip:5550000001@xxx;isup-oli=62>;
tag=a8KFgr53vtKyN
To: <sip:5555555555@xxx:5060>
Call-ID: 24169b4d-593d-454c-9f9f-835a99c6acf9
CSeq: 124533787 INVITE
Contact: <sip:5550000001@xxx:5070>
User-Agent: SIP-AGENT
Allow: INVITE, ACK, BYE, CANCEL, OPTIONS, MES-
SAGE, INFO, UPDATE, REGISTER, REFER, NOTIFY
Supported: timer, path, replaces
Allow-Events: talk, hold, conference, refer
Session-Expires: 3600;refresher=uac
Min-SE: 120
Content-Type: application/sdp
Content-Disposition: session
Content-Length: 273
Diversion:     <sip:5550000002@xxx:5060>;privacy=off;
screen=no; reason=user-busy; counter=1
Remote-Party-ID:   <sip:5550000001@xxx>;party=calling;
screen=yes;privacy=off
v=0
o=Sonus UAC 844748 224910 IN IP4 xxx
s=SIP Media Capabilities
c=IN IP4 xxx
t=0 0
m=audio 28548 RTP/AVP 0 18 101
a=rtpmap:0 PCMU/8000
a=rtpmap:18 G729/8000
a=fmtp:18 annexb=no
a=rtpmap:101 telephone-event/8000
a=fmtp:101 0-15
a=maxptime:20
```

From the example SIP INVITE message, the original caller's number 5550000001 can be ascertained from the "From" or "Remote-Party-ID" line, the original called number (the recipient's number) from the 'Diversion" line, and the application server's number from the "To" or INVITE line.

Application server 38 then sets the caller ID of the outgoing call to be a different phone number such as 5550000002 before making the outbound PSTN call 70 to the original recipient's number 555-000-0002. The call routes back out the VoIP gateway 37 to the PSTN 33, to the recipient's operator network 35 and to the recipient's device 36. Because the caller ID of this call is not in the blocklist on the recipient's device 36, the recipient's device 36 rings and the call is connected to the recipient with application server 38 bridging both the original caller and recipient's call legs. Again, the goal of having application server 38 in the middle of the call is accomplished without having to have an application running on the recipient's device to add the application server 38 to the call. Rather, settings on the operating system are set to add the application server 38 to the call.

In another embodiment, after the caller's diverted call arrives at application server 38, application server 38 creates a connection to the recipient device 36 using a VoIP call. Application server 38 can use pre-existing information stored in a mapping table to look up the VoIP address (e.g., a SIP uniform resource indicator (URI)) of the recipient's device application). Application server 38 sets the caller ID of the call to 5550000002 and makes the outgoing VoIP call to the recipient device 36, resulting in the device application receiving the incoming call as VoIP instead of as a PSTN call from its home operator.

The VoIP address mapping table can be populated by the device application on a regular basis (every hour, for example) so the information is available when the caller's call arrives at application server 38. Alternatively, application server 38 can send a push notification to the recipient's device application requesting its VoIP address only when the caller's call arrives at application server 38. After the recipient's device application receives the push notification requesting its VoIP address, the recipient's device 36 sends the information to application server 38. Upon receipt of this information, application server 38 then makes the outgoing VoIP call to the recipient device by using the newly reported VoIP address.

In another embodiment, when application server 38 receives the diverted call, the recipient's device 36 can dial in to application server 38 using a VoIP call instead of application server 38 calling out to the recipient's device 36. In this embodiment, upon receipt of an inbound call 68, application server 38 sends a push notification to the recipient's device application informing the device application that an inbound call has been received. The device application shows the recipient a notification or an incoming call screen on the recipient's device 36. If the recipient chooses to answer the call, the device application uses information in the push notification that includes the application server's VoIP address and initiates a VoIP call to application server 38. Upon receipt of this VoIP call from the recipient's device, application server 38 bridges the call to the diverted caller's call leg and establishes an end-to-end call between the caller and the recipient.

In another embodiment, the recipient's device calls in to application server 38 using a PSTN number after the diverted inbound call is received on application server 38. Application server 38 sends a push notification to the recipient's device application that includes the server's PSTN "dial-in" number. When the device application receives this push notification, the device application shows the recipient an incoming call screen. When the user answers the call, the device application initiates a PSTN call to the server's dial-in number. When application server 38 receives the recipient's PSTN call, application server 38 bridges the call with the diverted caller's call leg, thereby connecting both parties. This example allows the recipient to use a PSTN connection that is more stable than a VoIP call using the data connection for the recipient's device. In addition, the recipient is would be responsible for the cost of the outbound call from the recipient's device to application server 38 rather than application server 38 incurring the cost of the outbound PSTN call made to the recipient. This can be important for financial and business model reasons.

Automatically Generated Blocklist

In another embodiment, the blocklist can be generated not manually by a user but automatically by the device application. This enables a list of known numbers to be diverted to application server 38 when a caller ID of the calling user is in the blocklist of the receiving party. Automatically generated blocklists can be used when it is desirable to send calls from a group of known parties, such as work or client contacts, through application server 38 before the call is answered by the recipient. For example, recording of phone calls is desired in certain industries such as finance, where calls with clients need to be archived for regulatory compliance. By utilizing a blocklist including only clients, only calls from this group may be diverted to application server 38 automatically while calls from the user's personal contacts will ring the recipient's phone directly.

If the recipient's device does not contain the list of contact numbers to be automatically populated into the blocklist, the device application can download the list of phone numbers from an external server such as a database or Customer Relationship Management (CRM) system. The device application then automatically populates the blocklist with the list of the downloaded numbers. Incoming calls from clients that match the blocklist may then be automatically diverted to application server 38. If the application server 38 also has the same list of client numbers stored, application server 38 can check that the calling number matches this list and if so, perform specific actions such as recording the call, greeting the caller with a recorded message from the recipient's company, etc. before connecting the call with the recipient. Calls diverted to application server 38 that are not in a list on application server 38 can be configured to be directed to the voicemail of application server 38 as callers who are not on the blocklist are also routed to application server 38 due to the CCF settings on the device diverting calls that are not picked up by the recipient.

In another embodiment, one or more lists can be maintained by application server 38 to perform different functions on different callers. For example, work calls may be treated differently than nuisance callers, e.g., work calls may be recorded and then routed back to the recipient device whereas nuisance callers may be played a busy tone and not routed back to the recipient device. To accomplish this, the recipient's device needs to maintain only one blocklist associated with application server 38 while application server 38 maintains different lists with rules for each list or even individual rules for each calling number. Application server 38 can aggregate the different list of numbers and send it to the device application to populate a single blocklist on the device. Alternatively, the recipient's device can request and obtain the aggregated list from application server 38 to populate its blocklist.

Automatically Generating Inverse Blocklist or Whitelist

In another embodiment, it may be useful to block numbers that are not on a list of known callers. For example, the call recipient may choose to allow known callers to directly ring the recipient's device 36 and not be diverted to application server 38, whereas unknown callers will be first sent to application server 38 to be screened or recorded before the call is connected to the recipient's device.

To accomplish this, the device application can set up its blocklist to be all phone numbers that are not in a "whitelist" comprising the recipient's personal contacts from the device's address book and additional lists such as phone numbers of contacts obtained from CRM systems. Hence, calls from numbers that are from known contacts will not be blocked or diverted whereas unknown callers will be directed to application server 38 where features can be applied based on rules determined by the recipient.

An operating system of some recipient's devices may have functions that enable users to block all calls except for known callers. This would simplify the generation of the allowed-caller lists as the list of numbers to block could be large compared to the list of approved callers. If the option to block all calls except for those originating from whitelisted numbers exists on the device, the user can choose to place the list of known callers into the whitelist. Alternatively, the device application can generate and populate this whitelist on the device automatically.

Showing Caller's Phone Number to Recipient Even for Blocked Calls

In the embodiments above where application server 38 makes a call to the recipient's device 36 to connect the recipient to the diverted caller, application server 38 may first set the caller ID of the call to be a number other than the phone number of the original caller. This is so that the recipient's device 36 does not block and redirect the call again because it matches the blocklist. However, this means that while the call is not blocked, the recipient may see an unknown phone number and not the caller's name since the caller ID number will not match a contact in the recipient's device address book. The following represent some methods for overcoming this situation.

Temporarily Disabling the Number in the Blocklist

In the embodiments above where application server 38 makes a call to the recipient's device 36 to connect the recipient to the diverted caller, application server 38 may first set the caller ID of the call to be a number other than the phone number of the original caller. To display the name of the caller, additional actions can be performed to the call flow.

In one embodiment, before calling the recipient's device, application server 38 can first send a push notification to the device application to notify the device application that it will be receiving an incoming call from the caller's phone number. The device application can remove the phone number from the device's blocklist and send an acknowledgement using an Application Programmer's Interface (API) call to application server 38. Once this acknowledgement is received by application server 38, application server 38 can then make the outbound VoIP or PSTN call to the recipient's device. After the call is complete, the recipient's device can re-populate the blocklist with the phone number so subsequent calls from the caller are blocked and diverted again. If the device is unable to detect when the call completes, the application server 38 can, optionally, send another push notification to the recipient's device after the call ends to instruct it to add the caller's number to the blocklist again.

In another embodiment, application server 38 can send a push notification to the recipient's device to notify it to unblock the caller's number. However, application server 38 may choose not to wait for an acknowledgement from the recipient's device and, instead, make the connecting call to the recipient's device after sending the push notification, with the assumption that the push notification will be received by the device before the call is received.

Non-Blocked Number

Another embodiment utilizes a caller ID number not on the blocklist of recipient device 36 when the application server 38 makes an outbound PSTN or VoIP call to the recipient device 36. The application server 38 can set the caller ID number to be a phone number that only it is using. The phone number may be one of a plurality of numbers assigned or leased for the use by the application server 38.

Because this caller ID number will be used only by the application server 38, the device application can ensure that the blocklist does not contain the list of known application server caller ID numbers when automatically generating the blocklist.

Creating Contact for Ringing-in Number

Another embodiment that enables the display of the caller's name on the recipient device when an inbound call from application server 38 is received involves the creation of a contact book entry on the native device that matches the caller ID number that will be used by application server 38 for the call.

Prior to sending the call to the recipient's device, application server 38 can send a push notification to the recipient's device to inform it of the phone number of the original caller as well as the phone number that will be used as the new caller ID of the call from application server 38. When the device application receives this notification, the device application first looks up the contact its device address book corresponding to the original caller number. The device application then creates a new contact in the device address book with the name of the contact found and the new caller ID number that will be used by application server 38 for the incoming call.

The device application can send an acknowledgement that the new contact was created by using an API call to application server 38. Application server 38 can then initiate the call to the recipient's device with the new caller ID number and the recipient's device will show the name of the contact corresponding with the newly created address book entry. Optionally, the device application may not need to send an acknowledgement to application server 38 but application server 38 can make the call to the recipient's device after sending the push notification with the assumption that the push notification will be received by the recipient's device and the address book entry will be created before the call arrives on the recipient's device.

After the call is complete, the device application can remove the newly created contact from the device address book or keep it if application server 38 will re-use the same caller ID number for each unique caller number.

Determination of CCF or UCF

Figure 5:
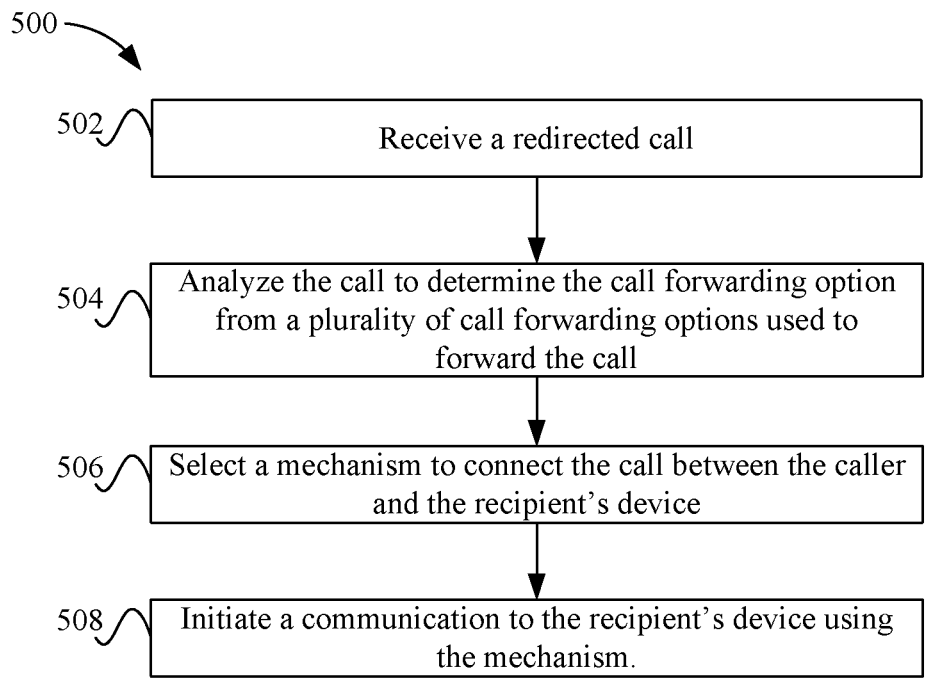
FIG. 5 depicts a simplified flowchart of a method for determining which of CCF or UCF was used according to some embodiments.

Application server 38 can receive the redirection via CCF or UCF. Different actions are taken to bridge the call between the caller and the callee based on whether CCF or UCF was used to redirect the call. FIG. 5 depicts a simplified flowchart 500 of a method for determining which of CCF or UCF was used according to some embodiments. At 502, application server 38 receives a redirected call. At 504, application server 38 analyzes the call to determine the call forwarding option from a plurality of call forwarding options used to forward the call. For example, application server 38 determines the call forwarding option that was used to forward the call. In some embodiments, application server 38 can distinguish between whether CCF or UCF was configured by looking at a "reason" parameter in a message, such as the SIP INVITE message. For example, a "reason=user-busy" means that CCF was used and the CCF on busy was triggered to divert the call. Also, a "reason=unconditional" means UCF was used.

At 506, application server 38 then selects a mechanism to connect the call between the caller and the recipient's device 36. The mechanism selected from the mechanisms described above based on the determining of the call forwarding option. At 508, application server 38 initiates a communication to the recipient's device 36 using the mechanism. The mechanism avoids triggering the call forwarding option set at the recipient's device 36. Then, at 510, application server 38 connects the call between the caller and the recipient's device upon initiating the communication. The application server 38 is now in the call path of the call and performs a call feature, such as processing media of the call or performing routing of the call.

Application Server Routing and Action Rules for Callers

In some embodiments, application server 38 can maintain a table of caller numbers and corresponding actions to perform when a diverted call arrives at the application server from the caller device 30. Actions can be routing-based and configured by the recipient's preference for each caller.

Routing-based actions can include not wanting to accept calls from specific callers or known spam numbers, or only to accept calls from known contact numbers. Feature-based actions can include automatically recording calls from work contacts or unknown numbers, or playing custom greetings to certain users. Users can also be placed into groups that have the same routing and feature configurations applied. Examples of group routing and features are for business client contacts to be greeted by the company greeting, friend contacts to hear a musical ringback tone, known nuisance callers to be played a busy tone and hung up on, known solicitation callers to be sent to voicemail, and unknown callers to have call recording applied automatically before the call is connected to the recipient's device 36.

Mixing Modes of Communication

Some embodiments enable users to communicate using "mixed mode" calls, such as a caller speaks (e.g., first mode) while a recipient can see (e.g., second mode) the caller's speech represented as text in real-time. The caller may be using voice to communicate because of safety or convenience (e.g., when driving or simply because speaking is faster than typing on a mobile device). However, the recipient may not be able to engage in a voice conversation due to social norms (e.g. at a library or lecture). The recipient may also want the text to supplement the speech audio due to an inability to hear the speaker (e.g., hearing impaired or in a loud location such as a concert).

In FIG. 4, a copy of the caller's speech is sent by the application server 38 to the speech-to-text engine 44 in real-time. The transcribed text is then sent at 43 the device application for display on the recipient device 36. Optionally, if both parties prefer to communicate in different languages, the transcribed text can first be sent to the language translation engine 47 and the translated text is then sent to the recipient device 36. The display of text on the recipient device 36 does not prevent the caller's speech from being sent to the recipient's device 36 so the choice to listen to the call is left to the recipient.

If able, the recipient can choose to speak replies that will be heard by the caller. However, if the recipient is unable to speak, the recipient can type a reply into the device application and the text is sent to a text-to-speech engine 46. The audio from the text-to-speech conversion is then sent to the application server 38 and played back as call audio to the caller. Optionally, the text reply can first be sent to the language translation engine 47 for translation to the caller's preferred language and the translated text then input to the text-to-speech engine 46 and the audio played back to the caller.

Figure 6:
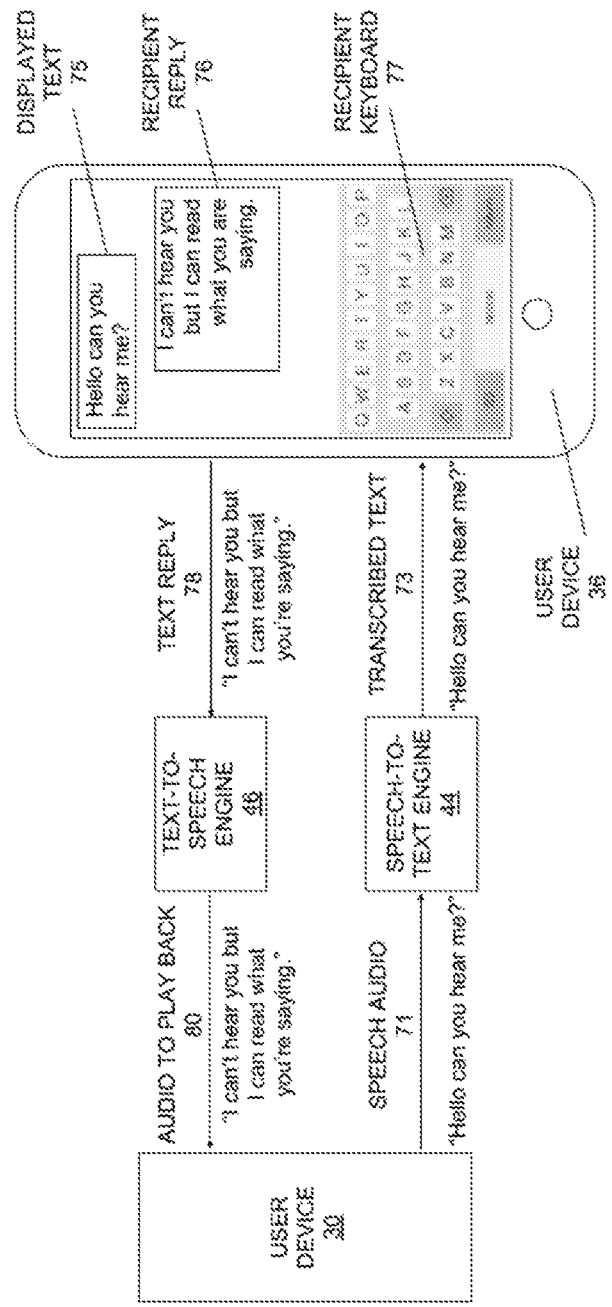
FIG. 6 depicts a system showing a flow of a conversation where voice is converted to text and text is used to reply according to some embodiments.

FIG. 6 depicts a system showing a flow of a conversation where voice is converted to text and text is used to reply according to some embodiments. A caller's device 30 transmits speech at 71 to a speech-to-text engine 44 that transcribes the audio into a stream of recognized text messages in real-time. The transcribed text is then sent at 73 to a recipient's device 36, which displays it at 75 using a device application on the device. The second user is able to type a response at 76 on the device keyboard at 77. Upon submitting the text response to the application, the application transmits the text reply at 78 to a text-to-speech engine 46 which converts the text to an audio stream that is sent at 80 to the voice user's device 30 and played back to the voice user. The process repeats itself when the voice user speaks a response to the reply. If able, the text recipient can also use voice to reply by speaking into the recipient device 36 and be heard by the caller device 30

System

Figure 7:
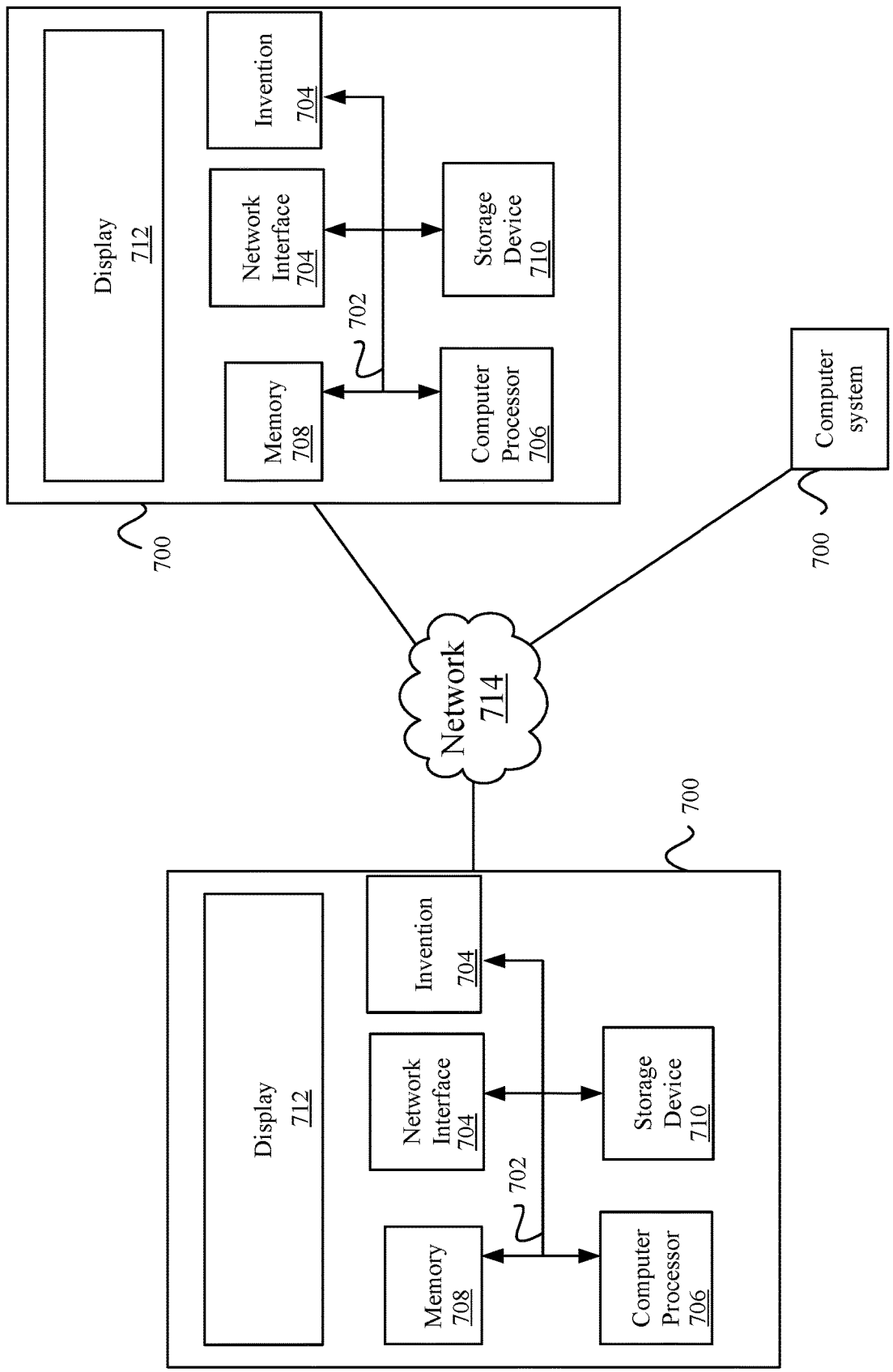
FIG. 7 illustrates an example of a special purpose computer systems configured with an application server according to one embodiment.

FIG. 7 illustrates an example of a special purpose computer systems 700-1-700-3 configured with an application server 38 according to one embodiment. Only one instance of computer system 700 will be described for discussion purposes, but it will be recognized that computer system 700 may be implemented for other entities described above, such as [other entities].

Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 708. Any suitable programming language can be used to implement the routines of particular embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by particular embodiments. The instructions, when executed by one or more computer processors 706, may be configured to perform that which is described in particular embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of particular embodiments may be distributed across computer systems 700 through network 714.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device coupled to a telephone network, a call from a caller device, wherein the call was first initiated via a first communication method from the caller device through the telephone network to an operator network associated with a recipient's device and the call is directed to first contact information for the recipient's device that is used by the operator network to reach the recipient's device directly, and wherein the call is forwarded using a call forwarding option by the operator network to third contact information for the computing device such that the computing device receives the call via the telephone network;

retrieving, by the computing device, second contact information for the recipient's device, the second contact information being different from the first contact information used in the call;

initiating, by the computing device, a communication to the recipient's device using the second contact information via a second communication method that is different from the first communication method, wherein the communication avoids triggering the call forwarding option that is still set on the recipient's device to forward calls to the computing device; and connecting, by the computing device, the call between the caller device and the recipient's device upon initiating the communication, wherein the computing device is in a call path of the call and performs a call feature for the call.

2. The method of claim 1, wherein the call forwarding option comprises an unconditional call forwarding option.

3. The method of claim 1, wherein the call forwarding option is triggered during the call to the recipient's device, and wherein the first communication method comprises sending the call through a Public Switched Telephone Network (PSTN), and wherein initiating the communication comprises:
  initiating a voice over Internet Protocol (VoIP) communication to the recipient's device at the second contact information, wherein the VoIP communication avoids triggering the call forwarding option for the recipient's device.

4. The method of claim 1, wherein initiating the communication comprises:
  sending a notification to the recipient's device at the second contact information using the second communication method;
  receiving a communication from the recipient's device; and
  connecting the call between the caller device and the recipient's device upon receiving the communication from the recipient's device.

5. The method of claim 4, wherein the communication from the recipient's device is a PSTN communication or a VOIP communication.

6. The method of claim 1, wherein the call forwarding option forwards all calls to the first contact information via the first communication method to the computing device but does not forward all calls to the second contact information to the computing device.

7. The method of claim 1, wherein connecting the call comprises:
  connecting a first leg of the call between the caller device and the computing device; and
  connecting a second leg of the call between the computing device and the recipient's device, wherein the computing device bridges the first leg of the call and the second leg of the call.

8. The method of claim 1, wherein the call feature comprises:
  connecting a first leg of the call between the caller device and the computing device via a voice mode of communication; and
  connecting a second leg of the call between the computing device and the recipient's device via a text mode of communication, wherein the computing device bridges the first leg of the call via voice and the second leg of the call via text using a speech to text converter and a text to speech converter.

9. The method of claim 1, wherein the call feature comprises:
  maintaining a list of caller number and corresponding actions to perform; and
  performing an action for the call based on third contact information for the caller device.

10. The method of claim 1, wherein:
  the first communication method comprises sending the call through a PSTN, and
  the second communication method comprises initiating the communication through one of the PSTN and a VOIP communication.

11. The method of claim 1, further comprising:
  screening the call from the caller device before initiating the communication to the recipient's device;
  translating voice media from the caller device to text during the screening; and
  providing the text to the recipient's device.

12. The method of claim 1, wherein the computing device receives voice transmitted via the first communication method the caller device via the call path, and transmits voice via the second communication method to the recipient's device via the call path.

13. A method comprising:
  receiving, by a computing device coupled to a telephone network, a call from a caller device that is directed to first contact information for a recipient's device, wherein the first contact information is used by an operator network to reach the recipient's device directly, the call forwarded via the operator network associated with the recipient's device to third contact information for the computing device using a call forwarding option;
  analyzing, by the computing device, information in the call to determine which call forwarding option from a plurality of call forwarding options was used to forward the call;
  selecting, by the computing device, a mechanism to connect the call between the caller device and the recipient's device with the computing device in a call path of the call, the mechanism selected from a plurality of mechanisms based on the determining of the call forwarding option;
  initiating, by the computing device, a communication to second contact information for the recipient's device using the mechanism, wherein the mechanism avoids triggering the call forwarding option set that is still set on the recipient's device to forward calls to the computing device; and
  connecting, by the computing device, the call between the caller device and the recipient's device upon initiating the communication, wherein the computing device is in the call path of the call and performs a call feature for the call.

14. The method of claim 13, wherein performing the call feature comprises:
  connecting a first leg of the call between the caller device and the computing device via a voice mode of communication; and
  connecting a second leg of the call between the computing device and the recipient's device via a PSTN call or a VoIP call, wherein the computing device simultaneously sends voice and text to the recipient's device.

15. The method of claim 13, wherein the plurality of call forwarding options comprise an unconditional call forwarding option and a conditional call forwarding option.

16. A method comprising:
  receiving, by a computing device coupled to a telephone network, a call from a caller device that is directed to first contact information for a recipient's device, wherein the first contact information is used by an operator network to reach the recipient's device directly, and wherein the call is forwarded via the operator network associated with the recipient's device to third contact information for the computing device using a call forwarding option such that the computing device receives the call via the telephone network;
  retrieving, by a computing device coupled to a telephone network, second contact information for a recipient's device;
  sending, by the computing device, a notification to a recipient's device at the second contact information, the notification indicating a caller device has made a call to the recipient;
  communicating, by the computing device, with the recipient's device to determine connection information; and
  connecting, by the computing device, a call between the caller device and the recipient's device using the connection information, wherein the computing device is in a call path of the call and performs a call feature for the call.

17. The method of claim 16, wherein performing the call feature comprises:
   connecting a first leg of the call between the caller device and the computing device; and
   connecting a second leg of the call between the computing device and the recipient's device, wherein the computing device bridges the first leg of the call and the second leg of the call.

18. The method of claim 16, wherein the call forwarding option comprises one of an unconditional call forwarding option and a conditional call forwarding option.

19. The method of claim 16, wherein: the telephone network comprises a PSTN, and the notification is sent via one of a data, PSTN, or a VOIP communication.

20. The method of claim 16, wherein connecting the call from the caller device comprises:
   receiving a call from the recipient's device, or
   initiating a call to the recipient's device.

\* \* \* \* \*